(12) United States Patent
Korall et al.

(10) Patent No.: US 6,684,183 B1
(45) Date of Patent: Jan. 27, 2004

(54) GENERIC NATURAL LANGUAGE SERVICE CREATION ENVIRONMENT

(75) Inventors: Toby Korall, Herzlya (IL); Eran Pe'er, Ramot Hashavim (IL); Erez Firt, Tel Aviv (IL); Dorit Deddi, Tel Aviv (IL)

(73) Assignee: Comverse Ltd., Tel Aviv (IL)

( * ) Notice: Subject to any disclaimer, the term of this patent is extended or adjusted under 35 U.S.C. 154(b) by 0 days.

(21) Appl. No.: 09/455,155

(22) Filed: Dec. 6, 1999

(51) Int. Cl.[7] .......................... G06F 17/27; G10L 15/00
(52) U.S. Cl. ................................ 704/9; 704/257
(58) Field of Search ........................ 704/8, 9, 10, 1, 704/255, 257, 231, 251

(56) References Cited

U.S. PATENT DOCUMENTS

| | | | | |
|---|---|---|---|---|
| 5,390,279 A | * | 2/1995 | Strong | 704/255 |
| 5,642,519 A | * | 6/1997 | Martin | 704/9 |
| 5,799,276 A | * | 8/1998 | Komissarchik et al. | 704/251 |
| 5,937,385 A | * | 8/1999 | Zadrozny et al. | 704/257 |
| 5,960,384 A | | 9/1999 | Brash | |
| 5,995,918 A | | 11/1999 | Kendall | |

* cited by examiner

Primary Examiner—Patrick N. Edouard
(74) Attorney, Agent, or Firm—Staas & Halsey LLP

(57) ABSTRACT

A system that allows a user to define a set of grammar rules containing variable types and terms associated with those types. The user enters sample phrases and identifies terms in the sample phrases that he wishes to define as a type, and then specifies which type that term corresponds to. The system, using the stored terms and types, generates grammar files which are specific to a particular automatic speech recognition engine.

14 Claims, 12 Drawing Sheets

GENERIC NATURAL LANGUAGE SERVICE CREATION ENVIRONMENT

BACKGROUND OF THE INVENTION

1. Field of the Invention

The present invention is directed to a system which provides for simple creation of grammar files, which can be used for natural language parsing. More particularly, the system learns the grammar via a graphical user interface from examples of possible text strings and outputs a grammar file using a specific format for use with a particular automatic speech recognition engine.

2. Description of the Related Art

Teaching computers to understand a naturally spoken language is a difficult and evolving field. The natural language has to be entered into a computer, and then processed by the computer so its contents are understood by the computer (parsing).

Naturally spoken language can be entered into a computer by numerous methods, such as typing on a keyboard or by speaking words into a microphone. The spoken words are then analyzed by an Automatic Speech Recognition (ASR) engine and translated into their textual equivalent (speech to text). The spoken words can also be spoken by a user via a telephone to the processing computer. Such a system allows a computer to carry out tasks previously requiring a human being, such as conducting banking transactions.

In order to carry out speech to text processing, an ASR engine must be programmed to understand certain words. Defining the syntax for a set of sentences that are valid at each state in an ASR transaction is a difficult task for the most experienced linguist. Understanding the language structure and the words of the target language is required. Translating this into a standard formalism understood by a computer or software developer adds even more complexity to the task.

Once the spoken words are translated into text by a programmed ASR engine, the text still needs to be parsed. One method of parsing language is known as Syntactic Parsing, in which rules are entered describing the relationship of words in a particular language. See U.S. Pat. No. 5,960,384, "Method and Device for Parsing Natural Language Sentences and Other Sequential Symbolic Expressions" for a more complete discussion of parsing.

One approach for defining words that are meaningful and their relationships is called a Backus Normal Form ("BNF") grammar. For example, the following are BNF grammar rules:

<object>="window"|"door";
<operation>="open"|"close";
<command>=<operation>the <object>

This small set of BNF grammar rules contains three definitions, the <object>, <operation> and <command>. There are two possible objects ("window" and "door"), two possible operations ("open" and "close"), and four possible commands ("open the window", "close the door", "open the door", and "close the window"). Thus, when a computer receives the naturally spoken phrase of "open the window," it will search the grammar rules until it finds the word "open" which it will interpret to be an <operation>. It will similarly process the word "window" which it would find to be an <object>. The phrase then becomes "<operation> the <object>" which the computer will find in the grammar rules to be a <command>. Therefore, the input string of "open the window," based on the BNF grammar entered, will be interpreted by a computer to be a <command>, wherein the <operation>="open" and the <object>="window." Once this information is obtained, it would typically then be passed to another routine or computer for further processing. For example, a voice activated robot using the grammar rules listed above would first parse the spoken phrase "open the window," then pass the command to another module of the robot so the command can actually be carried out.

The above example is very simple, however in order to define a BNF grammar which has practical applications, all variations of a natural language command should be considered. For example, using the above grammar rules, the phrase "shut the door" would not be recognized because of the undefined word "shut." For a set of grammar rules to be implemented as part of a practical application, tens of thousands of rules may need to be defined, an arduous task.

There are many proprietary types of ASRs which use BNF grammar, however there is no standard format for inputting a BNF grammar into an ASR. If one generic set of BNF grammar is to be used with numerous ASR engines, then each grammar set will have to be specifically translated to run on that engine. With a large set of grammar rules, such translation would be very time consuming.

Previously, the only way to create a set of grammar rules for a specific ASR engine is to use the proprietary tools provided by the specific vendor of the ASR engine. There are no industry standards. These tools are not extendable across multiple vendors. Conversion from BNF to a vendor specific syntax is a one-to-one mapping that is generated by a Context Free Grammar (CFG) conversion. The conversion is done prior to run-time, and is specific to the technology implemented on the target platform.

In addition, creating a large set of rules can be a very difficult and time consuming process. Grammar rules are typically entered by entering one definition at a time using a text interface.

What is needed is a system which allows for an easy and intuitive way to create grammar rules. What is also needed is a way to generate grammar rules specific for any ASR engine, without the user having knowledge of specific ASR engine syntax.

SUMMARY OF THE INVENTION

Various embodiments of the invention include a method and apparatus creating a set of grammar rules using a graphical user interface; creating a set of grammar rules by analyzing examples provided by the user; creating grammar rules for a variety of ASR engines without the operator having personal knowledge of each particular ASR format; reading proprietary ASR engine files and allowing a user to modify them using the methods described herein; and accepting queries from a user and using the ASR files generated by the methods or apparatus described herein to process the query.

The invention and its embodiments which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
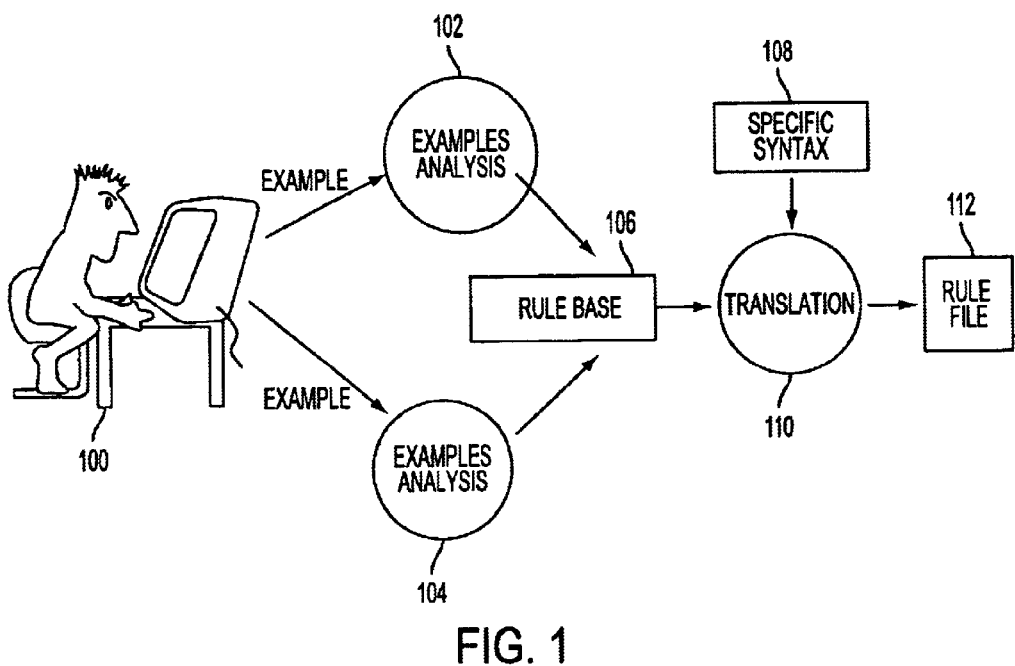
FIG. 1 is a flow diagram illustrating the process of generating a computer-readable rules file.

The improved method of creating a set of BNF rules of the present invention allows a user to create the BNF grammar rules by using "examples analysis." The user can enter examples of spoken phrases, using a keyboard or saved file, and highlight portions of the phrases and select what type of variable the highlighted portion consists of.

The detailed description which follows is presented in terms of programs and symbolic representations of operations of data bits within a computer memory, associated computer processors, networks, and network devices. These descriptions and representations are the means used by those skilled in the data processing art effectively convey the substance of their work to others skilled in the art. A program is here, and generally, conceived to be a self-consistent sequence of steps or actions leading to a desired result. Thus, the term "program" is generally used to refer to a series of operations performed by a processor, be it a central processing unit of a computer, or a processing unit of a network device, and as such, encompasses such terms of art as "objects", "functions", "subroutines" and "procedures."

In general, the sequence of steps in the programs require physical manipulation of physical quantities. Usually, though not necessarily, these quantities take the form of electrical or magnetic signals capable of being stored, transferred, combined, compared or otherwise manipulated. Those of ordinary skill in the art conveniently refer to these signals as "bits", "values", "elements", "symbols", "characters", "images", "terms", "numbers", or the like. It should be recognized that these and similar terms are to be associated with the appropriate physical quantities and are merely convenient labels applied to these quantities.

In the present case, the programs and operations are machine operations to be performed in conjunction with other machines and possibly human operators. Useful machines for performing the operations of the present invention include general purpose digital computers.

The apparatus set forth in the present application may be specifically constructed for the required purposes or it may comprise a general purpose computer or other network device selectively activated or reconfigured by a program stored in the computer. The procedures presented herein are not inherently related to any particular computer or other apparatus. In particular, various general purpose machines may be used with programs in accordance with the teachings herein, or it may prove more convenient to construct more specialized apparatus to perform the required method steps. In certain circumstances, when it is desirable that a piece of hardware possess certain characteristics, these characteristics are described more fully in the following text. The required structures for a variety of these machines may appear in the description given below.

With respect to the software described herein, those of ordinary skill in the art will recognize that there exists a variety of platforms and languages for creating software for performing the procedures outlined herein. Those of ordinary skill in the art also recognize that the choice of the exact platform and language is often dictated by the specifics of the actual system constructed, such that what may work for one type of general purpose computer may not be efficient on another type of general purpose computer.

FIG. 1 is a flow diagram illustrating the process of creating a rules file according to an embodiment of the present invention. First, the user enters examples on a computer 100, using, for example, a keyboard, file or ASR system. The examples are submitted to the examples analysis procedures 102 and 104, wherein the user identifies terms in the example phrases and selects their type. This is so later, when a query is parsed, the identified terms will be recognized. This process will be described in detail hereinafter. The results of the examples analysis 102 and 104 are stored in a rule base 106, which would typically be a BNF grammar rules set. The rule base 106 undergoes a translation procedure 110 to create a rules file 112. form readable by a particular automatic speech recognition (ASR) engine. Specific syntaxes for ASR's are stored in a specific syntax storage 108. A particular ASR engine is specified by the user. The specific syntax corresponding to the specified ASR is indexed in the specific syntax storage 108 allowing the translation procedure 110 of the rule base 106 into a rules file 112. The rules file is directly readable by an ASR engine, and can be stored on a computer readable storage medium. Thus, this process allows the simple creation of a rules file 112 using an ASR independent examples analysis, adapted for use with a specific ASR engine. Thus, the user need not have any particular knowledge of the specific syntax of the ASR engines.

In addition, the rule base 106 can saved independently on a storage medium, separate from the rules file 112. The rule base 106 then can be accessed and modified at a later time, to create a new rules file.

As an example of "examples analysis", consider a hotel reservation system operated by a computer using an ASR engine. It is desired that a caller talk directly to the computer to make hotel reservations without any interaction with another human. Using the system of the present invention in order to program the BNF grammar rules consists of an operator entering a plurality of possible spoken phrases used by customers when requesting a reservation.

Figure 2:
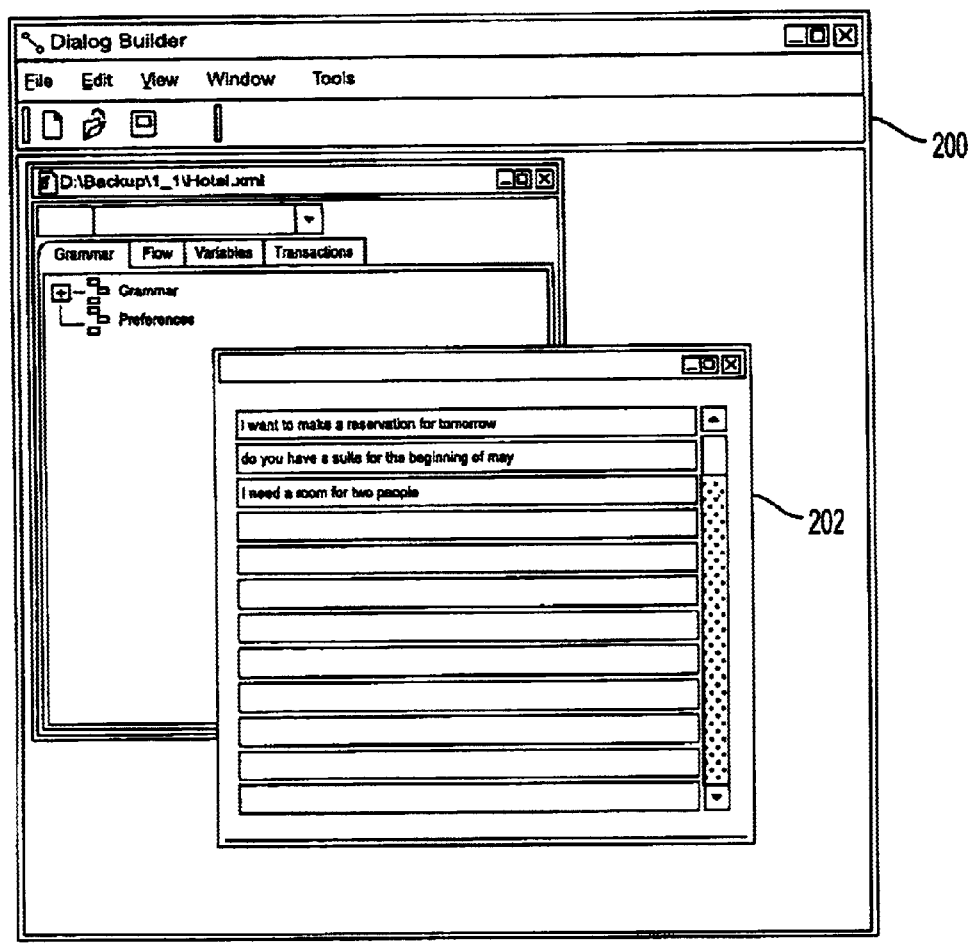
FIG. 2 is an image if a sample computer screen illustrating sample predicted queries.

FIG. 2 illustrates the graphical user interface (GUI) 200 used for rules file creation process. Predicted example phrases are entered in an example window 202. Entry of the example phrases may be performed in a variety of ways, as is known to those of ordinary skill in the art. In addition, the variable types to be defined are also entered in a type window (not shown). In our present example of the hotel reservation system, the system will need to know three variables, the <starting date>, <the room type>, and the <number of guests>.

Figure 3:
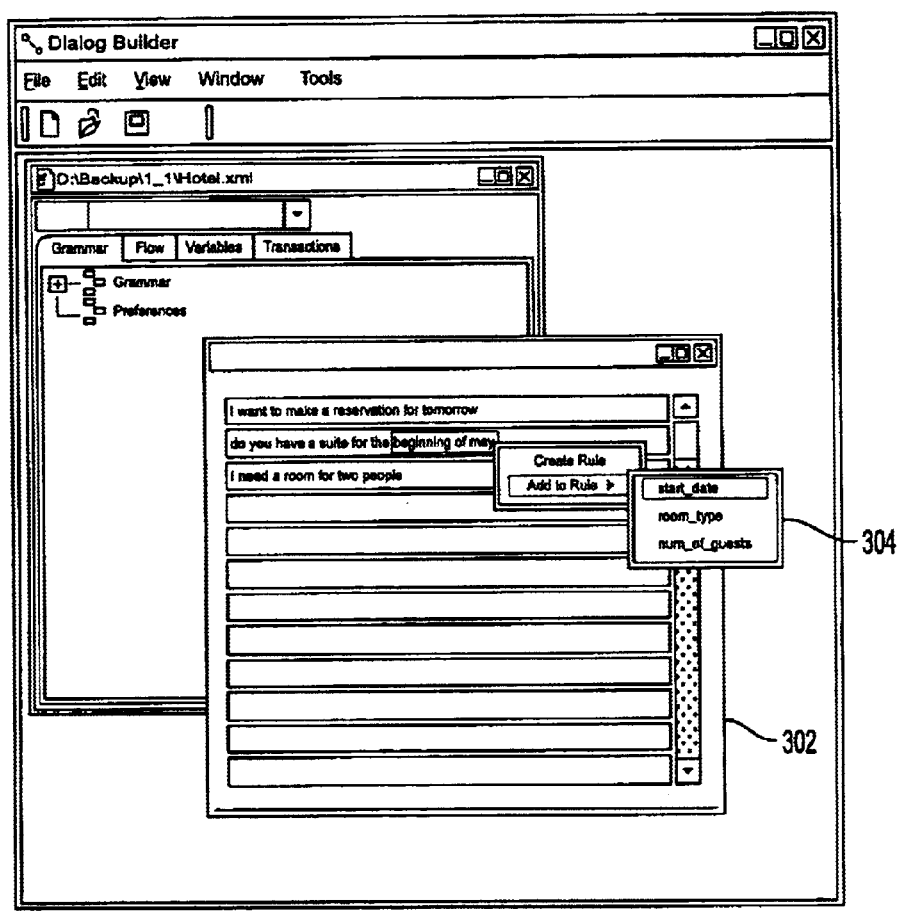
FIG. 3 is an image of a sample computer screen illustrating the process of defining terms.
Figure 4:
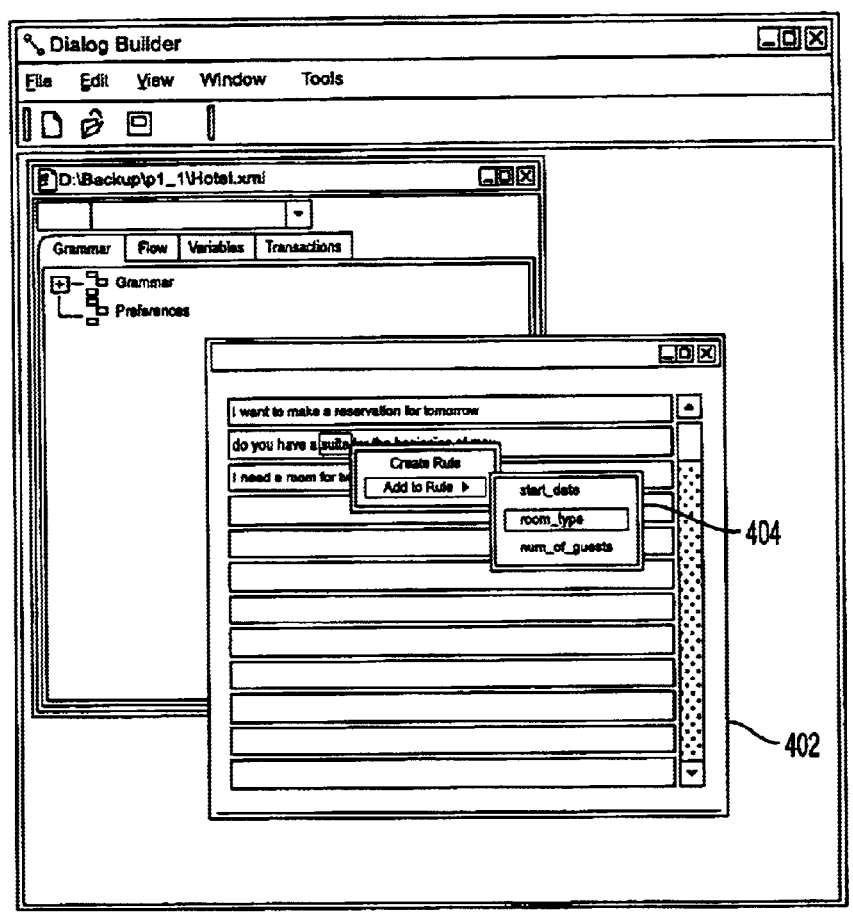
FIG. 4 is an image of a sample computer screen illustrating the process of defining terms.
Figure 5:
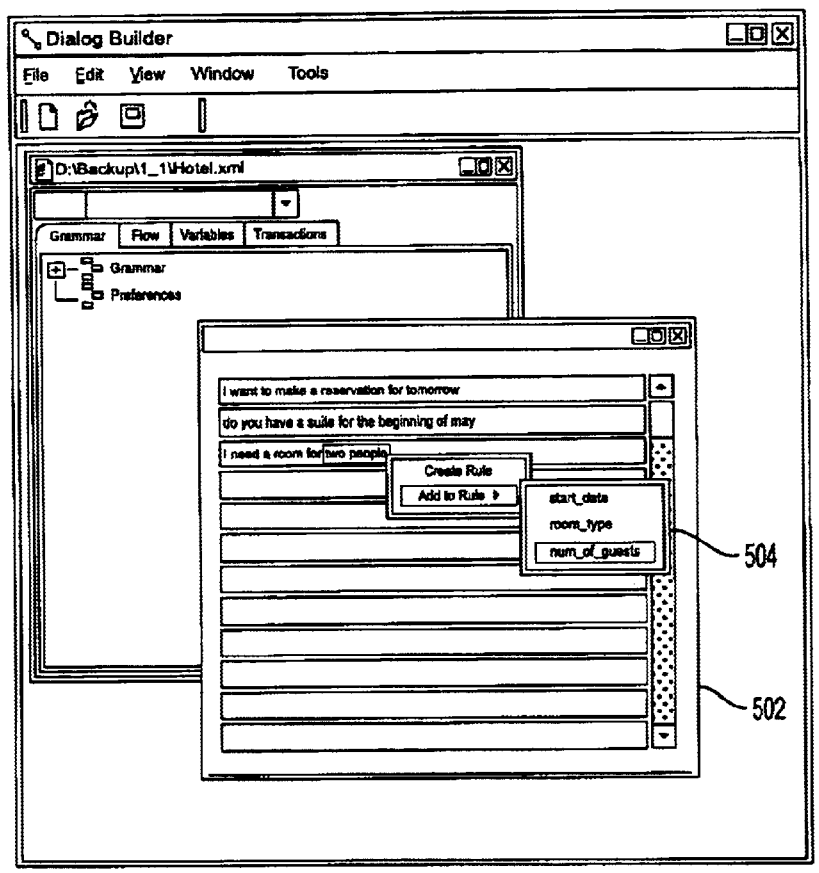
FIG. 5 is an image of a sample computer screen illustrating the process of defining terms.

The portions of the phrases that represent variables need to be identified. For example, in FIG. 3, the words "beginning of may" are highlighted by an operator in the example window 302. Then the operator identifies that this highlighted term corresponds to the variable <starting date> in a type selection window 304. Similarly, in FIG. 4, the word "suite" is highlighted in the example window 404, and identified as the variable <room type> in the type selection window 404. In FIG. 5, the phrase "two people" is identified as the variable <number of guests>.

Figure 6:
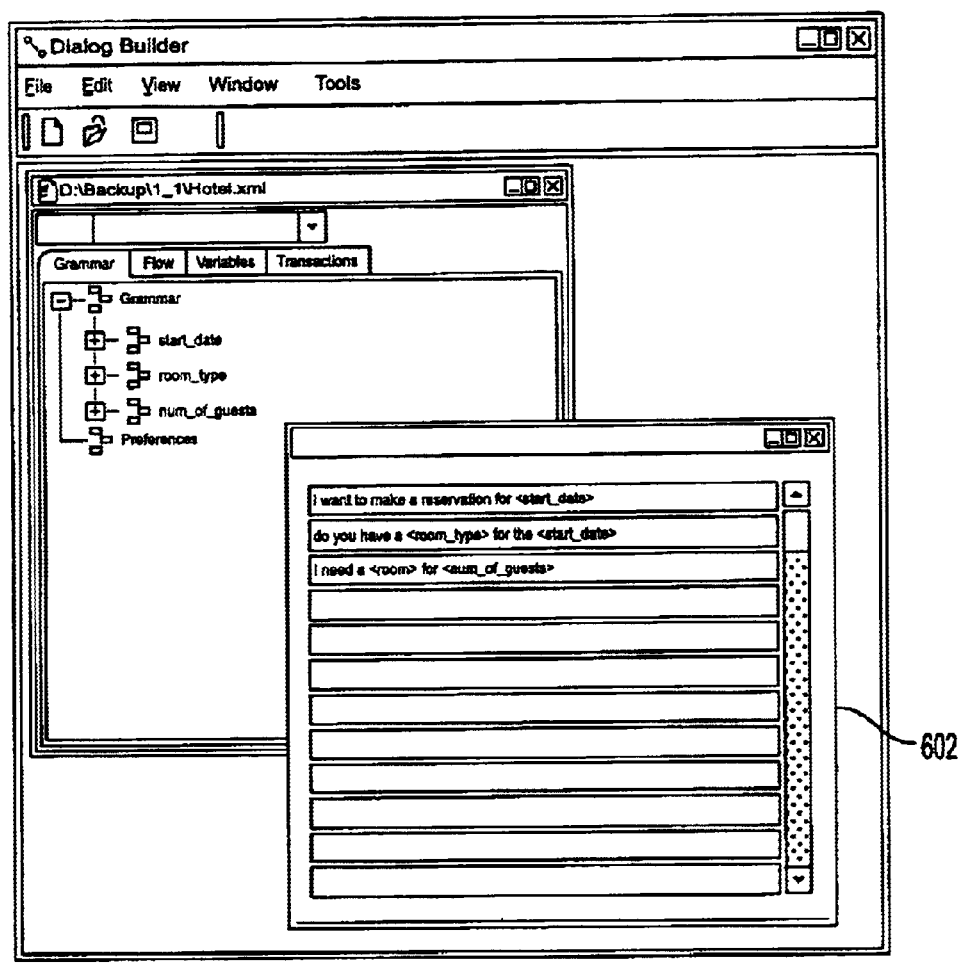
FIG. 6 is an image of a sample computer screen illustrating the replacement of the sample queries with terms replaced by their type.

When all of the variable definitions in the example phrases have been defined, a list of the phrases with the variable types in place of their original values can be produced in the example window 602, as shown in FIG. 6.

Figure 7:
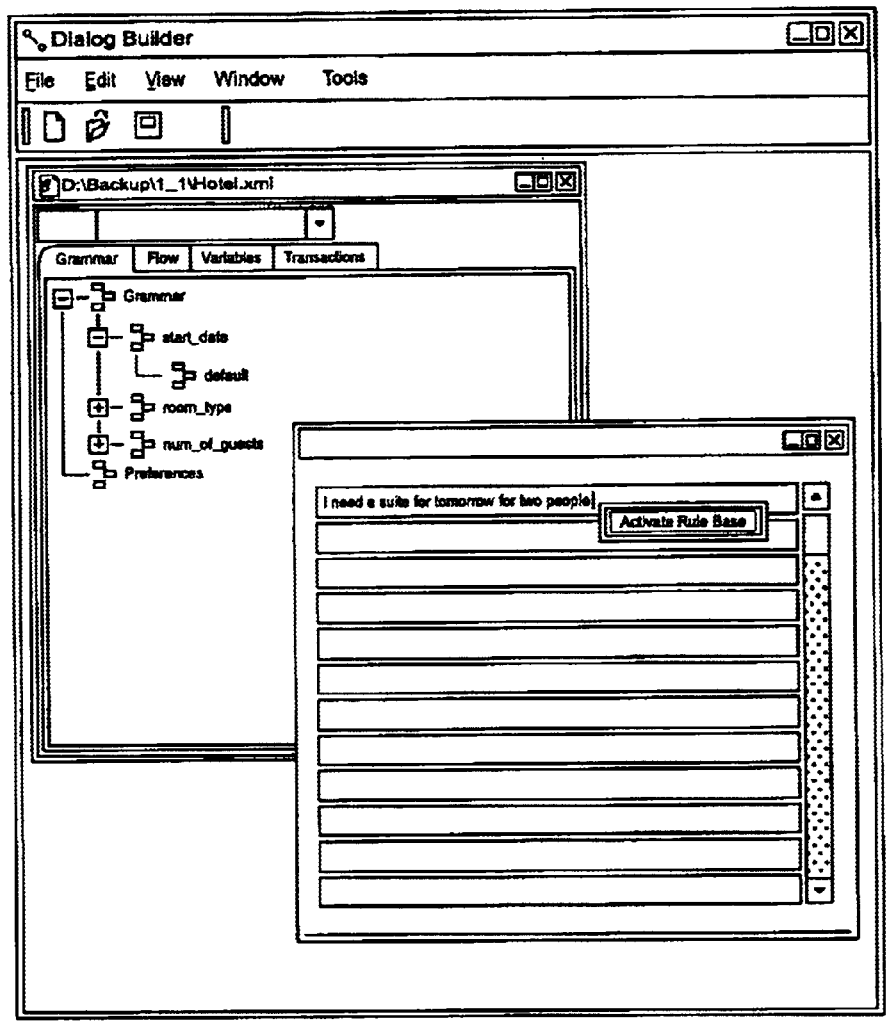
FIG. 7 is an image of a sample computer screen illustrating the entering of a query.
Figure 8:
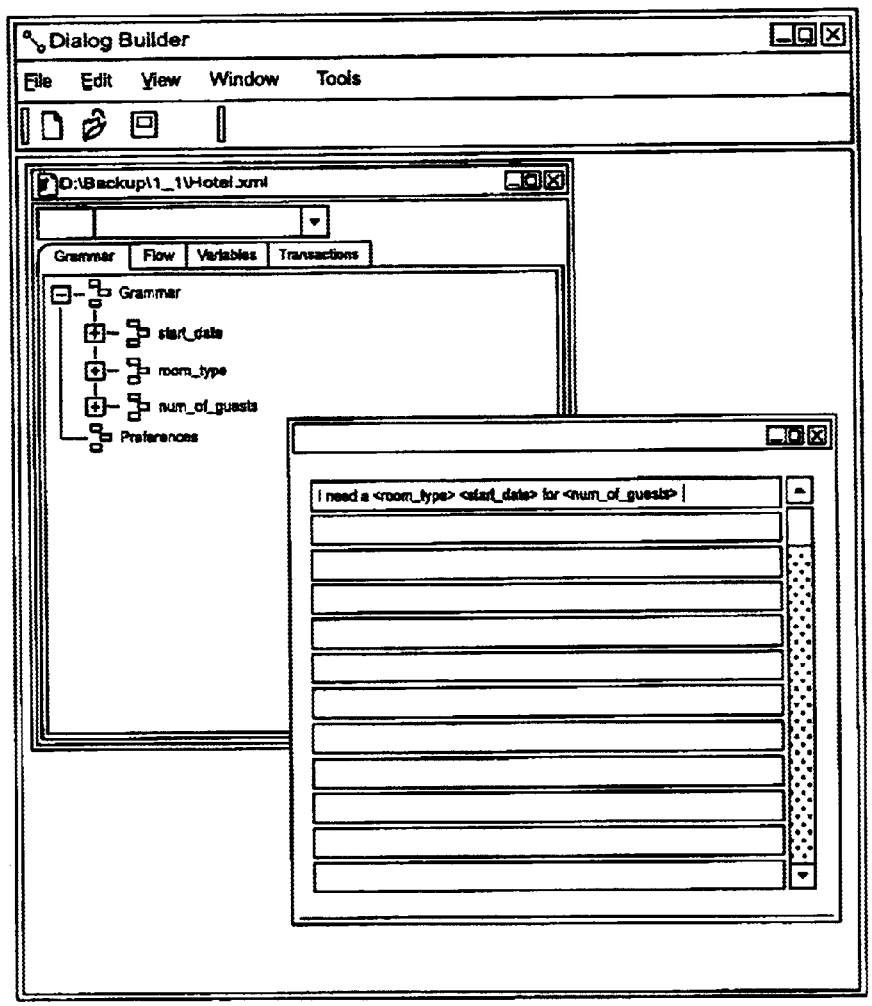
FIG. 8 is an image of a sample computer screen illustrating the result of analysis of the query entered in FIG. 7.

Now that some of the possible grammar rules for one simple example of a hotel reservation system have been defined, a query is entered via a keyboard into the graphical user interface as shown in FIG. 7, "I need a suite for tomorrow for two people." of course, this query could also be entered via a telephone connection. The system will search every word in the query to see if it is defined. The system identifies the variable types from their definitions, as in FIG. 8. Thus, it is determined that the <starting date>= "tomorrow", the <room type>="suite" and the <number of guests>="two". In an actual application, this information would thereafter be passed to another module of the reservation system that can actually carry out the process of making the reservation. Words in the query that are not defined are ignored.

Figure 9:
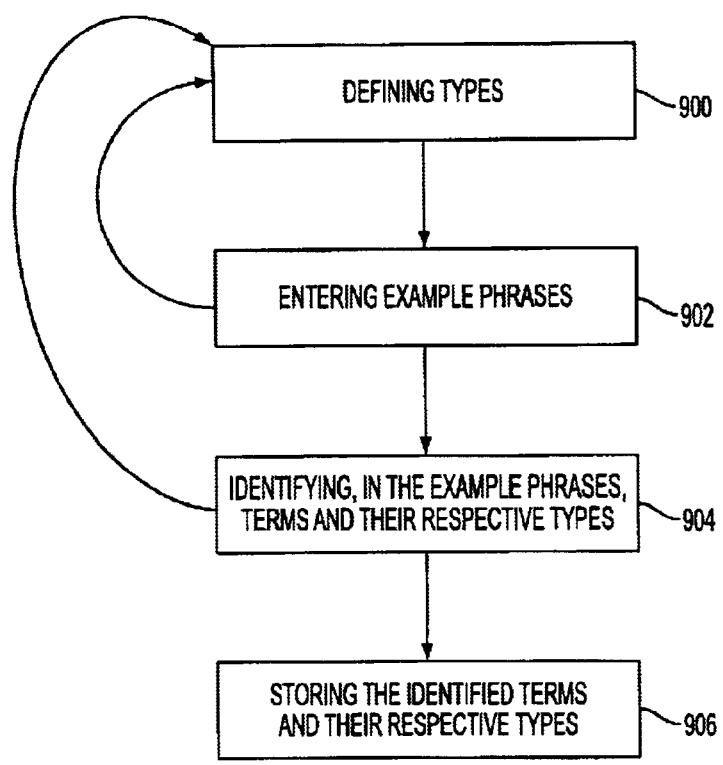
FIG. 9 is a flow chart illustrating the process of examples analysis.

FIG. 9 is a flowchart of the examples analysis process. First, types are defined in step 900. Then example phrases are entered in step 902. If any more types still need to be defined then flow of control can return to step 900. After all types are defined and example phrases are entered, then terms are identified as well as each term's respective type in step 904. If types still need to be defined at step 904 then flow of control can return to step 900. Next, the terms and their respective types are stored in step 906.

Figure 10:
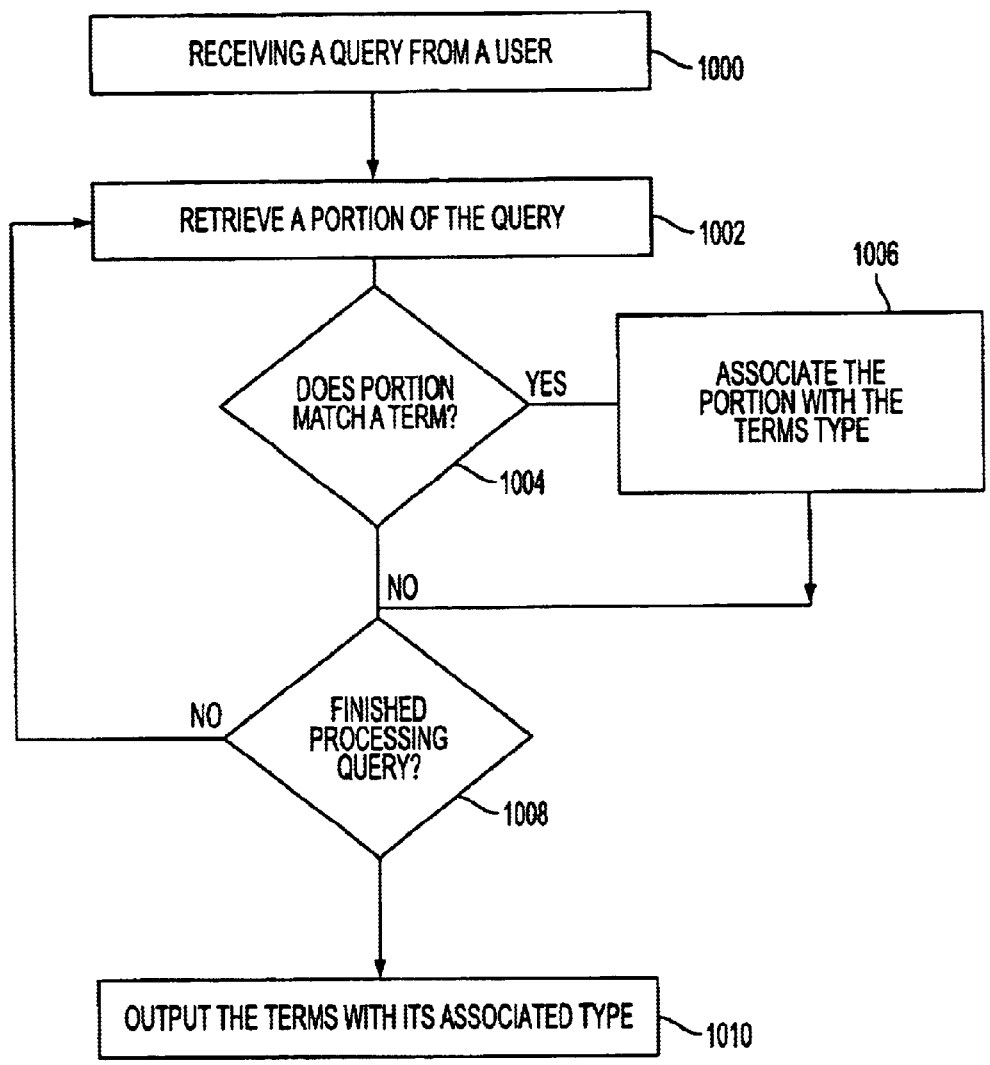
FIG. 10 is a flow chart illustrating the processing of a query.

FIG. 10 is a simplified flowchart of the processing of a query after the grammar rules have been defined. First, a query is received from the user in step 1000. If the query is received via spoken words, then the ASR rules file 112 that has been created previously are accessed in order for the ASR engine to translate from speech to text. Then a portion of the query is retrieved in step 1002, typically starting with the first word of the query. Each portion is compared with each term in step 1004, and when a match is found the portion is associated with the term's type in step 1006. This process is repeated, retrieving a next part of the query in step 1002 until the query is done being processed. Once the processing is done, the terms that have an associated type are output in step 1010.

During use, upon receiving an ASR input, the input is analyzed to identify the variables therein. In our example, if one of the three variables remains undefined, then the caller will be queried for the value of the missing variable. For example if the caller says, "I need a suite for 1 person," the system will then respond by asking the caller for the starting date.

Figure 11:
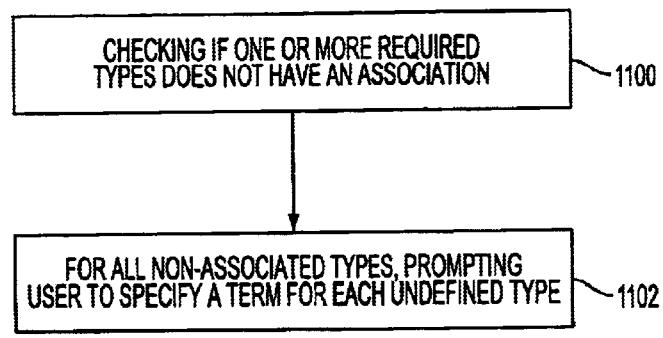
FIG. 11 is a flow chart illustrating the prompting for required types without an association.

FIG. 11 illustrates the process of a query containing an undefined variable. The system performs a checking operation to see if one or more required types does not have an association 1100. For all of the non-associated types, the user is prompted to specify a term 1102.

While each word in the query can be searched individually, some terms will consist of more than one word. For example, "for tomorrow" may be defined as a <starting date>, and "for 2 people" may be defined as <number of guests>. In this case, when the system recognizes the word "for" it will compare the subsequent word(s) with the definition set until it finds a match.

As illustrated in the above example, only words in the query which are defined are relevant, and the rest are discarded. Therefore, the caller can simply say "suite 2 people tomorrow" and the system will correctly associate each term in the phrase with its correct type. Alternatively, the caller could say "I am visiting my relatives and I need a suite for two people so I can come tomorrow to visit my daughter," as he would in real life.

In another embodiment, words which are not terms are not discarded, both in the defining process and the parsing. A query will have to fit with an entered example before the terms are identified. For example, the query "I want to make a reservation for May 1" will match up to the first example in FIG. 5. If the query is worded differently, such as, "I would like to make a reservation for May 1," this will not match up with any of the examples and cannot be parsed. The advantage of this embodiment is that the system will not misinterpret queries. For example, in the previous embodiment, the query "did you find three keys in a suite on March 20" will result in the system thinking a reservation is intended for three people in a suite on March 20. Of course, defining the grammar rules for this embodiment is more complex, because a set of grammar rules must completely cover all predicted phrases.

An advantage of using "examples analysis" instead of merely entering a list of terms and their respective type is that by using examples, terms may be introduced that would not have been obvious to the operator by using the latter method. For example, in our hotel reservation system, consider an example phrase, "it would be nice to reserve your biggest room for Christmas weekend for my wife and I." The operator would define "Biggest room" as a room type, "Christmas weekend" would be defined as the start date, and "wife and I" would be defined as number of guests. Only by using such an example phrase would the operator think to include definitions for these three terms. Merely using a list of numbers for the number of guests, or using a list of synonyms for words such as "suite" is inadequate to define the grammar for a practical system.

After grammar rules are created, a particular type of ASR engine can be specified so that the system can then generate files particular to the specific format. Thus, the present invention allows a standard basis for creating grammar rules which can then be used on any ASR platform. Therefore, the operator does not have to be familiar with the particular format of each ASR. By analogy, the generation of vendor-specific grammar rules functions like a compiler. A compiler takes a standard universal programming language (such as C) as converts it to run on a particular computing platform (usually the platform the compiler is executed on). In the case of the present invention, however, the operator can specify any ASR engine that the system supports, and code for that particular engine can be produced. This is accomplished by previously storing the particular formats for each ASR engine. Then translation is accomplished by matching each BNF grammar rule with the appropriate format to create an ASR instruction (or data) and storing the instructions (or data). The stored instructions are then transferred to the ASR engine.

Figure 12:
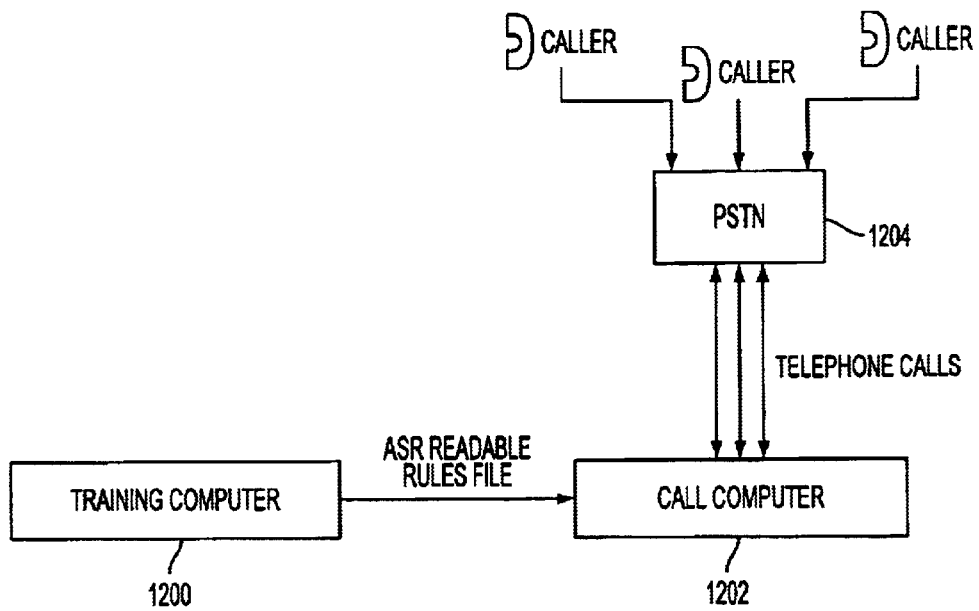
FIG. 12 is a block diagram of the interrelation of different elements.

FIG. 12 is a block diagram illustrating the relationship between the computer implementing the examples analysis (training computer), the computer dedicated to handling queries via telephone (call computer) and the caller himself. The training computer 1200 creates an ASR readable rules file using the examples analysis process and described herein. The file is transferred to the call computer 1202, where it is used by the call computer's ASR engine. A caller will communicate with the call computer 1202 typically via a publicly switched telephone network (PSTN) 1204, though he could communicate with the call computer via other methods as well such as a packet switched network. The system of course is equipped to handle simultaneous callers, as shown in the FIG. 12.

The system is language and country independent. Because the embodiments thus described do not utilize any particular features of the English language, it will work equally well using any language.

The invention also allows automatic verification of the entered BNF grammar. For example, the same word used as a possible value for two different variables will cause an ambiguous situation. Verification is important so that the set of grammar rules will be logically consistent before it is passed to the translation step.

In another embodiment of the present invention, the system reads files used by propriety ASR engines to allow an operator to modify grammar rules that were developed by another system. This could be considered to have a function similar to a decompiler. ASR instructions (or data) are identified using a pre-stored instruction set for a particular ASR engine, and converted to a generic BNF grammar form.

Figure 13:
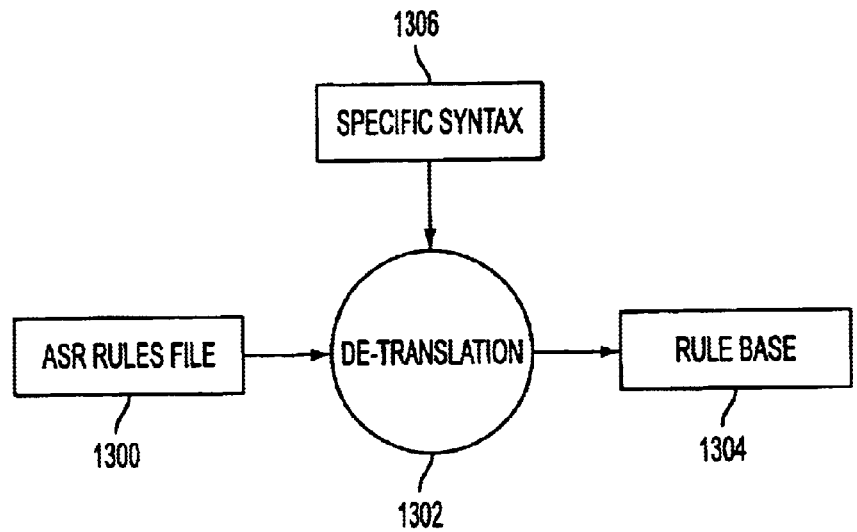
FIG. 13 is a flow diagram illustrating the process of de-translating a rules file into a rule base.

FIG. 13 illustrates the "de-translation" process described in the above paragraph. An ASR engine-specific rules file 1300, (same as 112 in FIG. 1) is processed by a computer which contains a storage of specific syntax 1306. The particular ASR engine that the rules file is designed for is designated by the user, and that particular syntax is indexed in the specific syntax storage 1306. The ASR file is then de-translated using the particular syntax, in order to create a rule base 1304. Once the process is finished, the rule base 1304 corresponds to the rule base 106 of FIG. 1, wherein the process as illustrated in FIG. 1 can then be carried out. Therefore, this embodiment allows a user to modify an ASR file by example analysis method, then translate the modified rule base into a rules file which modifies the original rules file. This modification process is much more economical than having to again create a rules file from scratch. Also in this manner, ASR files can be translated from one ASR engine to another, automatically.

Figure 14:
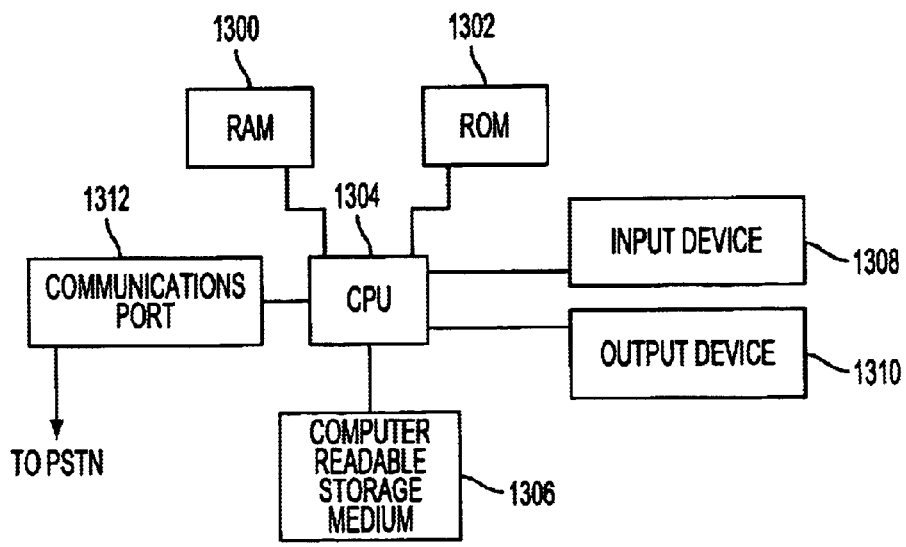
FIG. 14 is a block diagram illustrating a typical computer which can be used in conjunction with the present invention.

FIG. 14 represents a simplified design of one type of computer which can be used to carry out the processes described herein. Such a computer typically contains a CPU 1304, a RAM 1300, ROM 1302, a computer readable storage medium 1306 (such as a hard disk), input device 1308 (such as a keyboard) and output device (such as a CRT display). Such a computer can be used as the training computer 1200. The computer shown in FIG. 14 can also be used as a call processing computer 1202, if it also contains some type of communications port 1312 connected to a network such as a PSTN in order to process calls. The communications port should ideally be configured to allow simultaneous calls.

Another embodiment of the present invention allows for the processes described herein to be carried out by a program stored on a computer readable storage medium 1306. This computer readable storage medium 1306 may, for example, comprise a floppy disk, hard disk, CD-ROM, etc . . . , and does not have to be attached to a computer, as shown in FIG. 1306. Storing the processes described herein on a computer readable storage medium allows computers to perform the methods as described herein.

The many features and advantages of the invention are apparent from the detailed specification and, thus, it is intended by the appended claims to cover all such features and advantages of the invention which call within the true spirit and scope of the invention. Further, since numerous modification and changes will readily occur to those skilled in the art, it is not desired to limit the invention to the exact construction and operation illustrated and described, and accordingly all suitable modifications and equivalents may be resorted to, falling withing the scope of the invention.

What is claimed is:

1. A method of supplementing a grammar, comprising:
    defining types;
    entering example phrases on a computer, the example phrases comprising terms not used in the grammar;
    identifying, in the example phrases, the terms not in the grammar and their respective application grammatical type by sending the phrases to a parser; and
    storing the identified terms and their respective types in the grammar to supplement the grammar with the terms not used in the grammar.

2. The method recited in claim 1, further comprising automatically generating a grammar file readable by a specified automatic speech recognition engine.

3. The method recited in claim 1, further comprising reading a grammar file dedicated for a specific automatic speech recognition engine.

4. The method recited in claim 1, further comprising:
    receiving a query from a user;
    comparing portions of the query with the terms, wherein when a term and a portion of the query matches, the term is associated with the term's respective type; and
    outputting the terms that have associated with them a type, and outputting the associated type.

5. The method recited in claim 4, wherein the query is spoken over a telephone.

6. The method recited in claim 4, further comprising:
    checking if one or more required type(s) does not have an association; and
    unless the checking determines all the required types have an association, asking the user to specify a term for each undefined type.

7. A computer readable storage storing a program instructing a computer to perform a method of supplementing a grammar, comprising:
    allowing a user to define types;
    allowing the user to enter example phrases on a computer, the example phrases comprising terms not used in a grammar;
    allowing the user to identify, in the example phrases, terms and their respective application grammatical type based on the users knowledge of the grammar; and
    storing the identified terms and their respective types in the grammar to supplement the grammar with the terms not used in the grammar.

8. The computer readable storage medium as recited in claim 7, further comprising generating a grammar file readable by a specified automatic speech recognition engine.

9. The computer readable storage medium as recited in claim 7, further comprising reading a grammar file dedicated for a specific automatic speech recognition engine.

10. The computer readable storage medium recited in claim 7, further comprising:
- receiving a query from a user;
- comparing portions of the query with the terms, wherein when a term and a portion of the query matches, the term is associated with the term's respective type; and
- outputting the terms that have associated with them a type, and outputting the associated type.

11. The computer readable storage medium recited in claim 10, wherein the query is spoken over a telephone.

12. The computer readable storage medium recited in claim 10, further comprising:
- checking if one or more required type(s) does not have an association; and
- unless the checking determines all the required types have an association, asking the user to specify a term for each unassociated type.

13. A method comprising:
- defining types;
- entering example phrases on a computer;
- identifying, in the example phrases, terms and their respective type;
- storing the identified terms and their respective types;
- automatically generating a grammar file readable by a specified automatic speech recognition engine;
- reading a grammar file dedicated for a specific automatic speech recognition engine;
- receiving a query on the computer via a telephone;
- comparing, on the computer, portions of the query with the terms, wherein when a term and a portion of the query matches, the term is associated with the term's respective type;
- outputting the terms that have associated with them a type, and outputting the associated type;
- checking if one or more required type(s) does not have an association;
- unless the checking determines all the required types have an association, asking the user to specify a term for each undefined type;
- providing a type window allowing a user to enter a plurality of types;
- providing an example window allowing the user to enter example phrases containing words;
- receiving a highlighted selection of word(s) from the example phrases in the example window;
- providing a type selection window displaying the entered types;
- receiving a selected type from the type selection window;
- removing the type selection window; and
- storing the selected word(s) and the selected type in a storage device.

14. A method of supplementing a grammar using example phrases, comprising:
- identifying, in the example phrases, terms not in the grammar and identifying their respective application grammatical type using a parser; and
- storing the identified terms and their respective types in the grammar to supplement the grammar with the terms not used in the grammar.

* * * * *